United States Patent [19]

Tzikas et al.

[11] Patent Number: 5,554,733
[45] Date of Patent: Sep. 10, 1996

[54] REACTIVE AZO DYES CONTAINING PHENYLAMINO-CHLOROTRIAZINYLAMINO AND α,β-DIBROMOPROPROYLAMINO OR α-BROMOACRYLOYLAMINO FIBER REACTIVE GROUPS

[75] Inventors: Athanassios Tzikas, Pratteln; Rolf Deitz, Basel, both of Switzerland

[73] Assignee: Ciba-Geigy Corporation, Tarrytown, N.Y.

[21] Appl. No.: 411,258

[22] Filed: Mar. 27, 1995

[30] Foreign Application Priority Data

Mar. 30, 1994 [CH] Switzerland .......... 00 963/94

[51] Int. Cl.⁶ .......... C09B 62/085; C09B 62/473; D06P 3/24
[52] U.S. Cl. .......... 534/638; 8/549
[58] Field of Search .......... 534/638

[56] References Cited

FOREIGN PATENT DOCUMENTS

| | | | |
|---|---|---|---|
| 131545 | 1/1985 | European Pat. Off. | 534/638 |
| 50-157420 | 12/1975 | Japan . | |

OTHER PUBLICATIONS

Shirasaki et al., *Chemical Abstracts*, 84:123388 (1976) Abstract of JP 50–157,420 Dec. 19, 1975.
E. Siegel, *The Chemistry of Synthetic Dyes*, vol. VI, K. Venkataraman, pp. 130–134 (1972).

Derwent Abstract No. 23834A/13 (JP–A–75/157420) Dec. 19, 1975.

*Primary Examiner*—Fiona T. Powers
*Attorney, Agent, or Firm*—Kevin T. Mansfield

[57] ABSTRACT

Reactive dyes of formula

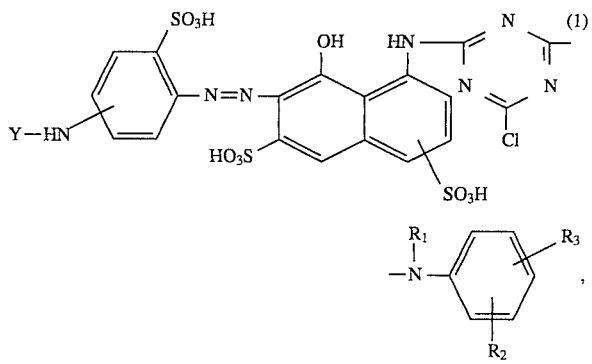

wherein $R_1$ is $C_1$–$C_4$alkyl which is unsubstituted or substituted by hydroxyl, $R_2$ and $R_3$ are each independently of the other hydrogen, $C_1$–$C_4$alkyl, $C_1$–$C_4$alkoxy, $C_2$–$C_4$alkanoylamino, halogen or sulfo, and Y is α,β-dihalopropionyl or α-haloacryloyl, are particularly suitable for dyeing or printing cellulosic fibre materials or natural or synthetic polyamide fibre materials, in high tinctorial yield, and give dyeings and prints with good fastness properties.

9 Claims, No Drawings

REACTIVE AZO DYES CONTAINING PHENYLAMINO-CHLOROTRIAZINYLAMINO AND α,β-DIBROMOPROPROYLAMINO OR α-BROMOACRYLOYLAMINO FIBER REACTIVE GROUPS

The present invention relates to novel reactive dyes, to the preparation thereof and to the use thereof for dyeing or printing fibre materials.

The practice of dyeing with reactive dyes has given rise in recent times to more stringent requirements being made of the quality of the dyeings and to the economy of the dyeing process. For this reason, there is still a need for novel reactive dyes with improved properties, especially application properties.

At present it is necessary to provide reactive dyes which have excellent uptake and which at the same time give dyeings having high dye fixations. The dyeings obtained with the reactive dyes should also have good levelness. The dyes of the prior art do not meet these requirements in all respects.

The present invention therefore has for its object to provide novel improved reactive dyes for dyeing and printing fibre materials, which dyes have the above specified qualities to a high degree. The novel dyes shall be distinguished in particular by excellent fixation yields and superior fibre-dye bond stability. They shall also produce dyeings with good allround fastness properties, for example lightfastness and wetfastness.

It has been found that this object is substantially achieved with the novel reactive dyes defined below.

Accordingly, the invention relates to reactive dyes of formula

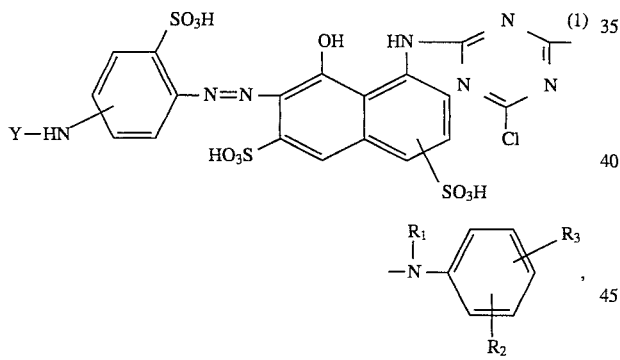

wherein $R_1$ is $C_1$–$C_4$alkyl which is unsubstituted or substituted by hydroxyl, $R_2$ and $R_3$ are each independently of the other hydrogen, $C_1$–$C_4$alkyl, $C_1$–$C_4$alkoxy, $C_2$–$C_4$alkanoylamino, halogen or sulfo, and Y is α,β-dihalopropionyl or α-haloacryloyl.

$R_1$, $R_2$ and $R_3$ defined as $C_1$–$C_4$alkyl may suitably be methyl, ethyl, propyl, isopropyl, butyl, isobutyl, sec-butyl or tert-butyl. Methyl or ethyl is preferred.

$R_2$ and $R_3$ defined as $C_1$–$C_4$alkoxy may suitably be methoxy, ethoxy, propoxy, isopropoxy, butoxy, sec-butoxy, isobutoxy or tert-butoxy. Methoxy or ethoxy is preferred.

$R_2$ and $R_3$ defined as $C_2$–$C_4$alkanoylamino may suitably be acetylamino, propionylamino or butyrylamino. Acetylamino is preferred.

$R_2$ and $R_3$ defined as halogen may suitably be fluoro or bromo and, preferably, chloro.

$R_1$ is preferably $C_1$–$C_4$alkyl, more particularly methyl or ethyl, and most preferably ethyl.

$R_2$ and $R_3$ are preferably independently of each other hydrogen, $C_1$–$C_4$alkyl, $C_1$–$C_4$alkoxy, $C_2$–$C_4$alkanoylamino or halogen. $R_2$ and $R_3$ are most preferably hydrogen.

Y is preferably α,β-dibromopropionyl, α,β-dichloropropionyl, α-bromoacryloyl or α-chloroacryloyl. α,β-Dibromopropionyl or α-bromoacryloyl is particularly preferred.

Preferred reactive dyes are those of formula (1), wherein $R_1$ is methyl or ethyl, $R_2$ and $R_3$ are hydrogen and Y is α,β-dibromopropionyl, α,β-dichloropropionyl, α-bromoacryloyl or α-chloroacryloyl. α,β-Dibromopropionyl or α-bromoacryloyl are particularly preferred.

Particularly interesting reactive dyes are those of formula (1), wherein the radical -NH-Y is in meta-position relative to the azo bridge.

Particularly preferred reactive dyes are those of formulae

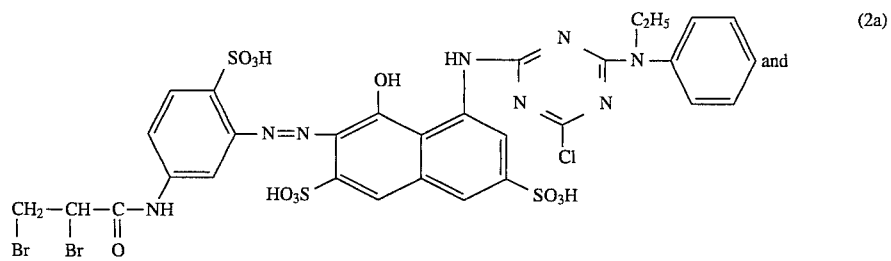

-continued

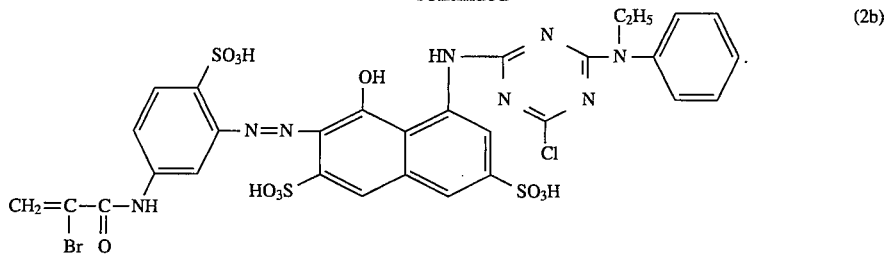

The reactive dye of formula (2a) is very particularly preferred.
Other particularly preferred reactive dyes are those of formulae

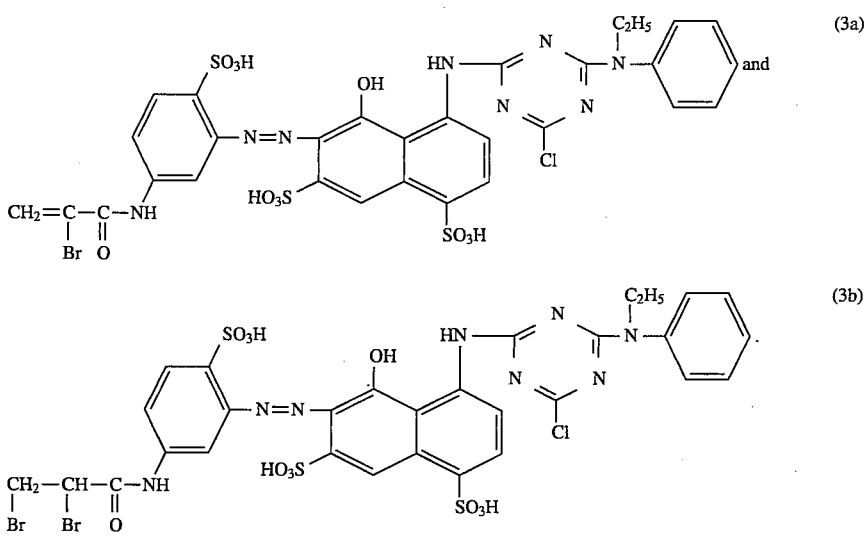

The reactive dye of formula (3a) is very particularly preferred.

The invention also relates to a process for the preparation of the reactive dyes of formula (1), which comprises diazotising an amine of formula

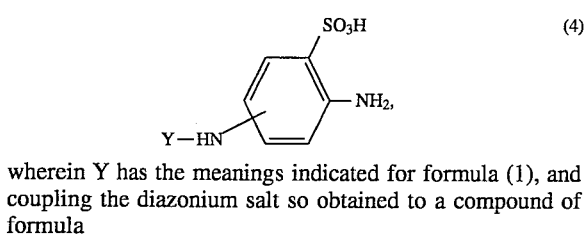

wherein Y has the meanings indicated for formula (1), and coupling the diazonium salt so obtained to a compound of formula

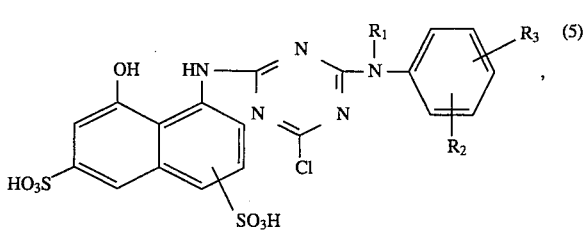

wherein $R_1$, $R_2$ and $R_3$ have the meanings indicated for formula (1) and, if desired, converting Y as a α,β-dihalopropionyl radical into the α-haloacyloyl radical.

The diazotisation and coupling are carried out in per se known manner. Accordingly, the diazotisation of the amine of formula (4) is usually carried out by treatment with nitrous acid in an aqueous solution of mineral acid at low temperature, such as from 0° to 20° C., and the coupling to the coupling component of formula (5) is carried out in the acid, neutral or weakly alkaline pH range, preferably at pH 2 to 6.

An α,β-dihalopropionyl radical Y may subsequently be converted into the α-haloacryloyl radical. This conversion reaction is usually carried out in a neutral to alkaline medium in the temperature range from typically 20° to 70° C. and at pH 6 to 14. The pH can be adjusted with, for example, aqueous sodium hydroxide.

In the novel process for the preparation of the reactive dyes of formula (1), the substituents of the compounds of formulae (4) and (5) have the meanings and preferred meanings defined above.

The compounds of formulae (4) and (5) are known or can be prepared in general accordance with known processes.

Accordingly, the compounds of formula (5) can be obtained by condensing a compound of formula

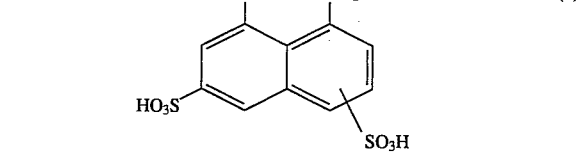

with cyanuric chloride and by condensing the condensate so obtained with a compound of formula

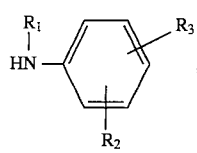

wherein $R_1$, $R_2$ and $R_3$ have the meanings indicated for formula (1).

The condensations are carried out in per se known manner, conveniently in aqueous solution and in the temperature range from e.g. 0° to 40° C. and at a pH from e.g. 1 to 6. The condensation of the compound of formula (6) with cyanuric chloride is preferably carried out in the temperature range from 0° to 10° C. and at pH 1 to 3. The condensation of the condensate so obtained with the compound of formula (7) is preferably carried out in the temperature range from 0° to 30° C. and at pH 4 to 6.

The reactive dyes of formula (1) are obtained either in the form of their free acid or, preferably, as the salts thereof. Suitable salts are typically alkali metal salts, alkaline earth metal salts or ammonium salts, or the salts of an organic amine. Typical examples are the sodium, lithium, potassium or ammonium salts, or the salt of mono-, di- or triethanolamine.

The reactive dyes of formula (1) are suitable for dyeing or printing nitrogen-containing or hydroxyl group-containing fibre materials, in particular natural polyamide fibre materials such as wool, and synthetic polyamide fibre materials such as polyamide 6 or polyamide 66. They are suitable for dyeing or printing woollen fabrics and yarns, and blends

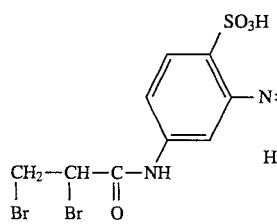

thereof with synthetic polyamide. This textile material can be in any form of presentation such as fibre, yarn, wovens or knits.

The reactive dyes of formula (1) can be used for dyeing or printing by the conventional dyeing or printing processes. In addition to containing water and the dyes, the dye liquors or printing pastes may contain further auxiliaries, for example wetting agents, antifoams, levelling agents or agents which influence the property of the textile materials, e.g. softeners, flameproofing additives, or dirt, water and oil repellents, as well as water softeners and natural or synthetic thickeners, e.g. alginates and cellulose ethers.

The dyeings obtained with the novel reactive dyes of formula (1) are level and have good allround fastness properties, in particular good fastness to rubbing, wet treatment, wet-rubbing and light. They are also distinguished by uniform colour build-up, good fibre affinity, high reactivity, good fixation, excellent build-up and good compatibility with other dyes.

The invention is illustrated by the following Examples in which parts and percentages are by weight, unless otherwise stated. The ratio of parts by weight to parts by volume is the same as that of kilograms to liters.

Example 1:24 parts of 2-(α,β-dibromopropionylamino)aniline-5-sulfonic acid are suspended in 176 parts of water with the addition of 7 parts of sodium chloride at c. 20° C. and the suspension is adjusted to pH 4.4. The suspension so obtained is then diazotised by addition of 13.5 parts of hydrochloric acid (32%) and 15 parts of a 4N solution of sodium nitrite. After c. 4 hours, excess nitrite is destroyed with sulfamic acid.

The above suspension of the diazo component is adjusted to c. 10° C. and pH 5 and then run over c. 30 minutes into a solution containing 30 parts of the compound which, in the form of the free acid, corresponds to formula

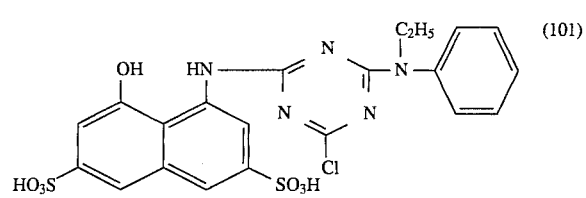

in 280 parts of water and which is adjusted to pH 5. The pH is kept at 5 by addition of an aqueous solution of sodium hydroxide. The reaction solution is then stirred at room temperature until the diazonium salt is no longer detectable, and the product is salted out by addition of sodium chloride. The product is filtered, washed off with an aqueous solution of sodium chloride and dried, giving a dye which, in the form of the free acid, corresponds to the compound of formula

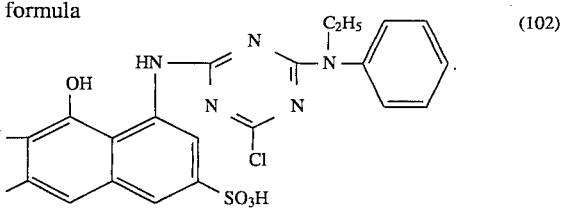

The dye of formula (102) dyes wool and polyamide in a red shade.

Example 2:24 pans of 2-(α,β-dibromopropionylamino)aniline-5-sulfonic acid are suspended in 176 parts of water with the addition of 7 parts of sodium chloride at c. 20° C. and the suspension is adjusted to pH 4.4. The suspension so obtained is then diazotised by addition of 13.5 of hydrochloric acid (32%) and 15 pans of a 4N solution of sodium nitrite. After c. 4 hours, excess nitrite is destroyed with sulfamic acid.

The above suspension of the diazo component is adjusted to c. 10° C. and pH 5 and then run over c. 30 minutes into a solution containing 30 parts of the compound which, in the form of the free acid, corresponds to formula

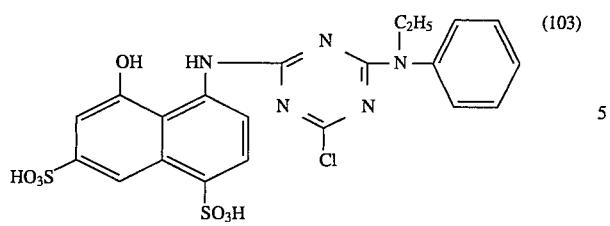

(103)

in 280 parts of water and which is adjusted to pH 5. The pH is kept at 5 by addition of an aqueous solution of sodium hydroxide. The reaction solution is then stirred at room temperature until the diazonium salt is no longer detectable. To acylate the product so obtained, the reaction mixture is heated to c. 30° C. and the pH is adjusted to 11 by addition of an aqueous solution of sodium hydroxide. After c. 30 minutes, the pH of the batch is adjusted to 6.5 and the product is salted out by addition of sodium chloride. The product is filtered, washed off with an aqueous solution of sodium chloride and dried, giving a dye which, in the form of the free acid, corresponds to the compound of formula

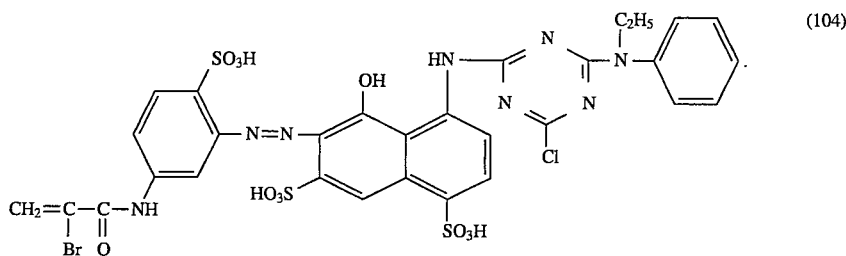

(104)

The dye of formula (104) dyes wool and polyamide in a red shade.

Examples 3 to 5: The dyes of formulae

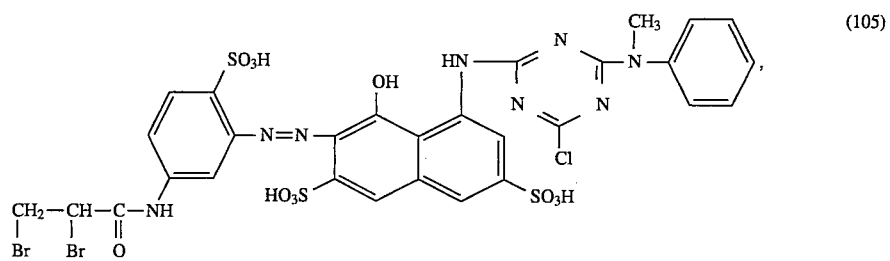

(105)

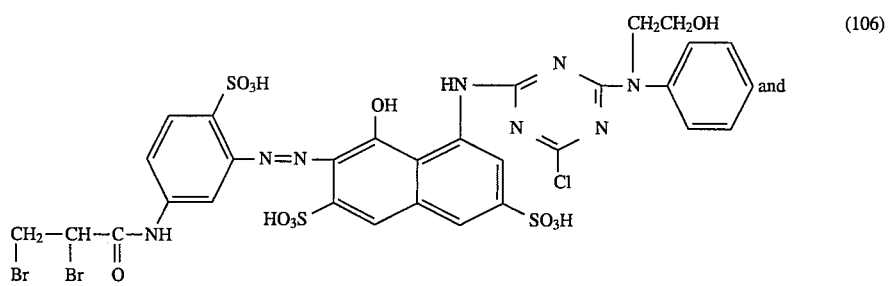

(106)

and

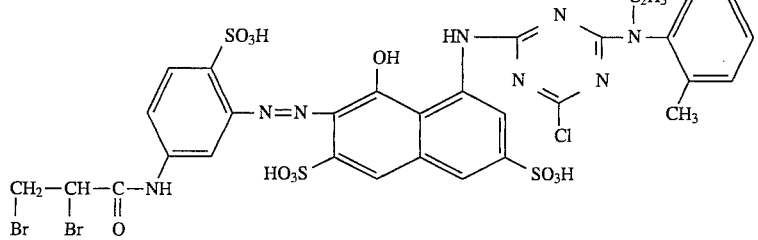

(107)

can be obtained in general accordance with the procedure of Example 1. The dyes of formulae (105), (106) and (107) dye wool and polyamide in a red shade.

Dyeing Procedure 0.1 part of the dye according to Example 1 is dissolved in 200 parts of water and 0.5 part of sodium sulfate, 0.1 part of a levelling agent (based on the condensate of a higher aliphatic amine and ethylene oxide) and 0.5 part of sodium acetate are added. The pH of the solution is then adjusted to 5.5 with acetic acid (80%). The dyebath is heated over 10 minutes to 50° C. and 10 parts of a woollen fabric are then put into it. The dyebath is heated over c. 50 minutes to 100° C. and dyeing is carded out for 60 minutes at this temperature. The dyebath is then allowed to cool to 90° C. and the dyed fabric is removed. The woollen fabric is washed with warm and cold water and then centrifuged and dried, giving a red dyeing with good lightfastness and wetfastness properties and good levelness.

What is claimed is:

1. A reactive dye of the formula

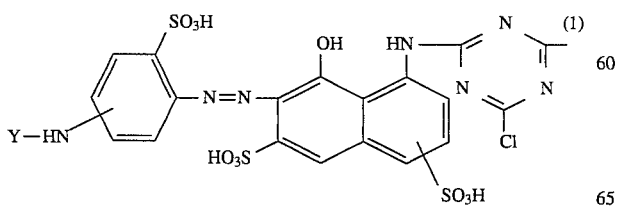

-continued

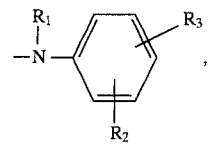

wherein $R_1$ is $C_1$-$C_4$alkyl which is unsubstituted or substituted by hydroxyl, $R_2$ and $R_3$ are each independently of the other hydrogen, $C_1$-$C_4$alkyl, $C_1$-$C_4$alkoxy, $C_2$-$C_4$alkanoylamino or halogen and Y is α,β-dibromopropionylamino or α-bromacryloyl.

2. A reactive dye according to claim 1, wherein $R_1$ is methyl or ethyl.

3. A reactive dye according to claim 1, wherein $R_1$ is ethyl.

4. A reactive dye according to claim 1, wherein $R_2$ and $R_3$ are hydrogen.

5. A reactive dye according to claim 1, wherein $R_1$ is methyl or ethyl, $R_2$ and $R_3$ are hydrogen.

6. A reactive dye according to claim 1, of formulae

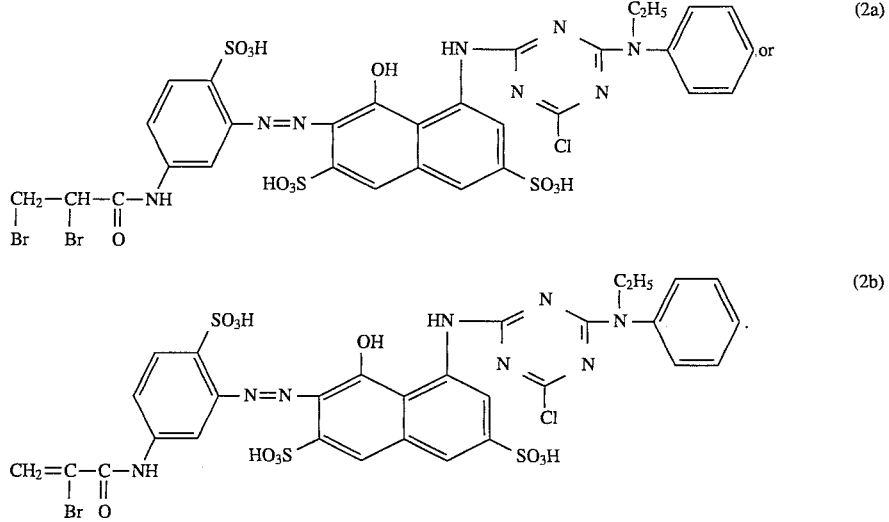

7. A reactive dye according to claim 1, of formulae

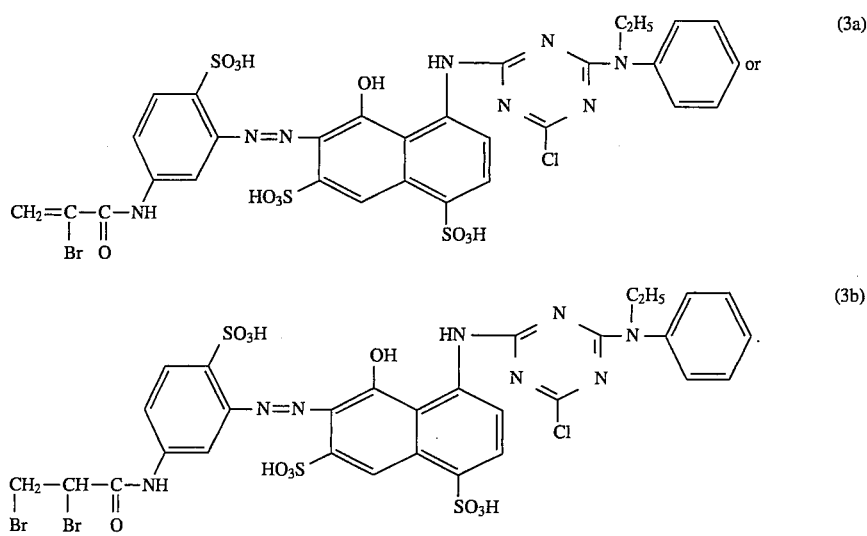
8. A process for dyeing or printing hydroxyl group-containing or nitrogen-containing fibre material, which process comprises applying to said fibre material a tinctorial amount of a reactive dye according to claim 1.
9. A process according to claim 8 wherein said fibre material is natural or synthetic polyamide fibre material.
* * * * *